(12) United States Patent
Cao et al.

(10) Patent No.: US 11,695,595 B2
(45) Date of Patent: Jul. 4, 2023

(54) PHASE TRACKING FOR INITIAL ACCESS

(71) Applicant: QUALCOMM Incorporated, San Diego, CA (US)

(72) Inventors: Yiqing Cao, Beijing (CN); Xiao Feng Wang, San Diego, CA (US); Huilin Xu, Temecula, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/594,646

(22) PCT Filed: May 15, 2020

(86) PCT No.: PCT/CN2020/090436
§ 371 (c)(1),
(2) Date: Oct. 25, 2021

(87) PCT Pub. No.: WO2020/238650
PCT Pub. Date: Dec. 3, 2020

(65) Prior Publication Data
US 2022/0200823 A1    Jun. 23, 2022

(30) Foreign Application Priority Data

May 30, 2019   (WO) ................ PCT/CN2019/089169

(51) Int. Cl.
*H04L 5/00* (2006.01)
*H04L 25/02* (2006.01)

(52) U.S. Cl.
CPC ........ *H04L 25/0226* (2013.01); *H04L 5/0048* (2013.01); *H04L 25/0228* (2013.01)

(58) Field of Classification Search
CPC .................. H04L 25/0226; H04L 5/0048; H04L 25/0228
See application file for complete search history.

(56) References Cited

U.S. PATENT DOCUMENTS

| | | | |
|---|---|---|---|
| 2008/0101306 A1* | 5/2008 | Bertrand | H04L 27/2636 370/344 |
| 2018/0359069 A1 | 12/2018 | Nam et al. | |
| 2019/0149365 A1 | 5/2019 | Chatterjee et al. | |

FOREIGN PATENT DOCUMENTS

| | | |
|---|---|---|
| CN | 108650001 A | 10/2018 |
| KR | 20190040702 A | 4/2019 |

(Continued)

OTHER PUBLICATIONS

International Search Report and Written Opinion—PCT/CN2020/090436—ISA/EPO—dated Aug. 18, 2020.

(Continued)

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a user equipment (UE) may receive an indication that a high Doppler configuration is activated. The UE may detect, based at least in part on receiving the indication that the high Doppler configuration is activated, a phase tracking reference signal (PTRS) for a remaining minimum system information (RMSI) communication. The PTRS may be configured by the high Doppler configuration. Numerous other aspects are provided.

30 Claims, 10 Drawing Sheets

(56) References Cited

FOREIGN PATENT DOCUMENTS

| WO | WO-2018106075 A1 | 6/2018 |
| WO | 2018231555 A1 | 12/2018 |
| WO | WO-2019029711 A | 2/2019 |
| WO | 2019058548 A1 | 3/2019 |

OTHER PUBLICATIONS

International Search Report and Written Opinion—PCT/CN2019/089169—ISA/EPO—dated Feb. 26, 2020.
Qualcomm: "Remaining Issues on NR DM-RS", R1-1716783, 3GPP TSG RAN WG1 Meeting NR#3, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18-21, 2017, Sep. 25, 2017 (Sep. 25, 2017), 30 Pages, XP051353912, Retrieved from the Internet: URL: http://www.3gpp.org/ftp/tsg_ran/WG1_RL1/TSGR1_AH/NR_AH_1709/Docs/ [retrieved on—Sep. 25, 2017], 4.5.2 DL DMRS bundling in time domain, The Whole Document.
Supplementary European Search Report—EP20815103—Search Authority—Munich—dated Dec. 6, 2022.

* cited by examiner

PHASE TRACKING FOR INITIAL ACCESS

CROSS-REFERENCE TO RELATED APPLICATIONS

This application is a 371 national stage of PCT Application No. PCT/CN2020/090436 filed on May 15, 2020, entitled "PHASE TRACKING FOR INITIAL ACCESS," which claims priority to International Patent Application No. PCT/CN2019/089169, filed on May 30, 2019, entitled "PHASE TRACKING FOR INITIAL ACCESS," which are hereby expressly incorporated by reference herein.

FIELD OF THE DISCLOSURE

Aspects of the present disclosure generally relate to wireless communication and to techniques and apparatuses for phase tracking for initial access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication that a high Doppler configuration is activated; and detecting, based at least in part on receiving the indication that the high Doppler configuration is activated, a phase tracking reference signal (PTRS) for a remaining minimum system information (RMSI) communication, wherein the PTRS is configured by the high Doppler configuration.

In some aspects, a UE for wireless communication may include memory and one or more processors operatively coupled to the memory. The memory and the one or more processors may be configured to receive an indication that a high Doppler configuration is activated; and detect, based at least in part on receiving the indication that the high Doppler configuration is activated, a PTRS for an RMSI communication, wherein the PTRS is configured by the high Doppler configuration.

In some aspects, a non-transitory computer-readable medium may store one or more instructions for wireless communication. The one or more instructions, when executed by one or more processors of a UE, may cause the one or more processors to receive an indication that a high Doppler configuration is activated; and detect, based at least in part on receiving the indication that the high Doppler configuration is activated, a PTRS for an RMSI communication, wherein the PTRS is configured by the high Doppler configuration.

In some aspects, an apparatus for wireless communication may include means for receiving an indication that a high Doppler configuration is activated; and means for detecting, based at least in part on receiving the indication that the high Doppler configuration is activated, a PTRS for an RMSI communication, wherein the PTRS is configured by the high Doppler configuration.

In some aspects, a method of wireless communication, performed by a base station (BS), may include transmitting an indication that a high Doppler configuration is activated; and transmitting a PTRS, configured by the high Doppler configuration, for an RMSI communication.

In some aspects, a BS for wireless communication may include memory and one or more processors operatively coupled to the memory. The memory and the one or more processors may be configured to transmit an indication that a high Doppler configuration is activated; and transmit a PTRS, configured by the high Doppler configuration, for an RMSI communication.

In some aspects, a non-transitory computer-readable medium may store one or more instructions for wireless communication. The one or more instructions, when executed by one or more processors of a BS, may cause the one or more processors to transmit an indication that a high Doppler configuration is activated; and transmit a PTRS, configured by the high Doppler configuration, for an RMSI communication.

In some aspects, an apparatus for wireless communication may include means for transmitting an indication that a high Doppler configuration is activated; and means for transmitting a PTRS, configured by the high Doppler configuration, for an RMSI communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
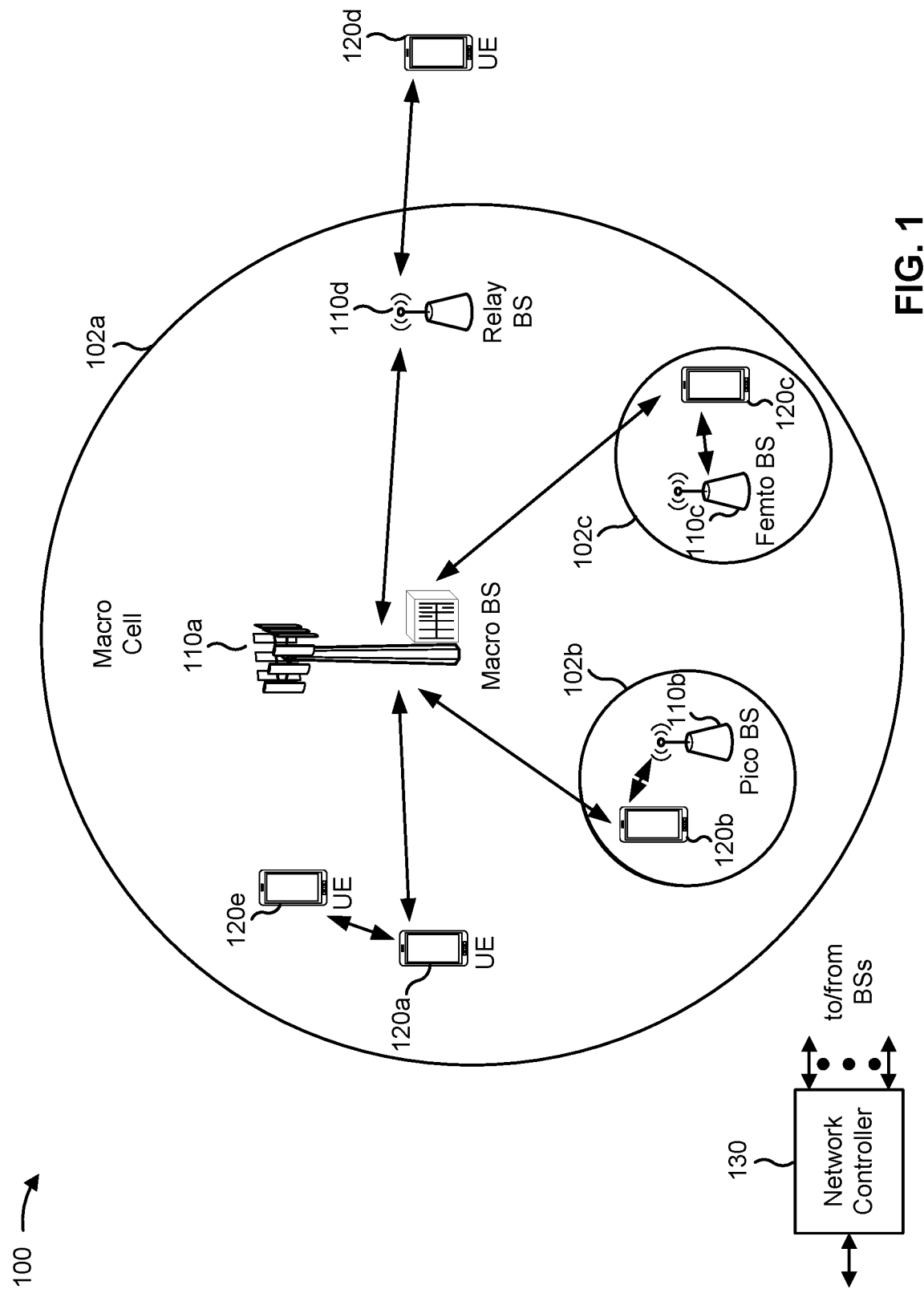
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may remain stationary or move according to the location of a mobile BS. For example, wireless network 100 may include one or more a non-terrestrial network (NTN) deployments in which non-stationary satellites may be used as BSs. In this case, the satellites may communicate directly and/or indirectly with other entities in wireless network 100 using satellite communication. The other entities may include UEs, other satellites in the one or more NTN deployments, other types of BSs (e.g., stationary or ground-based BSs), one or more components and/or devices included in a core network of wireless network 100, and/or the like.

In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
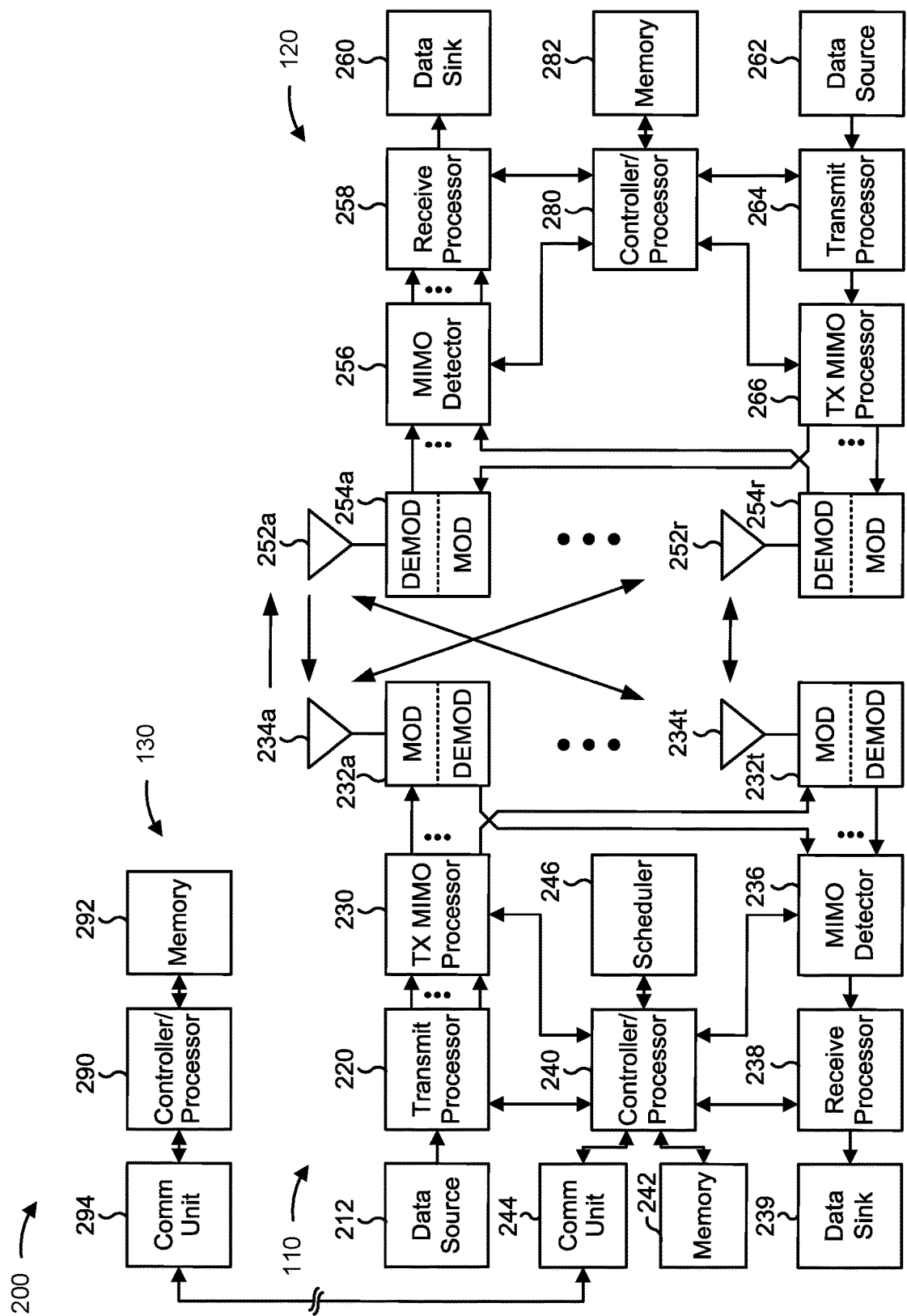
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and may communicate with network controller 130 via communication unit 244 (e.g., via a wireline backhaul, via a wireless backhaul, via a satellite communication link, and/or the like). Network controller 130 may include communication unit 294, controller/processor 290, and memory 292.

Controller/processor 240 of base station 110, controller/processor 280 of UE 120, and/or any other component(s) of FIG. 2 may perform one or more techniques associated with phase tracking reference signal configuration for a random access procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication that a high Doppler configuration is activated, means for detecting, based at least in part on receiving the indication that the high Doppler configuration is activated, a phase tracking reference signal (PTRS) for a remaining minimum system information (RMSI) communication, wherein the PTRS is configured by the high Doppler configuration, and/or the like. In some aspects, such means may include one or more components of UE 120 described in connection with FIG. 2.

In some aspects, base station 110 may include means for transmitting an indication that a high Doppler configuration is activated, means for transmitting a PTRS, configured by the high Doppler configuration, for an RMSI communication, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
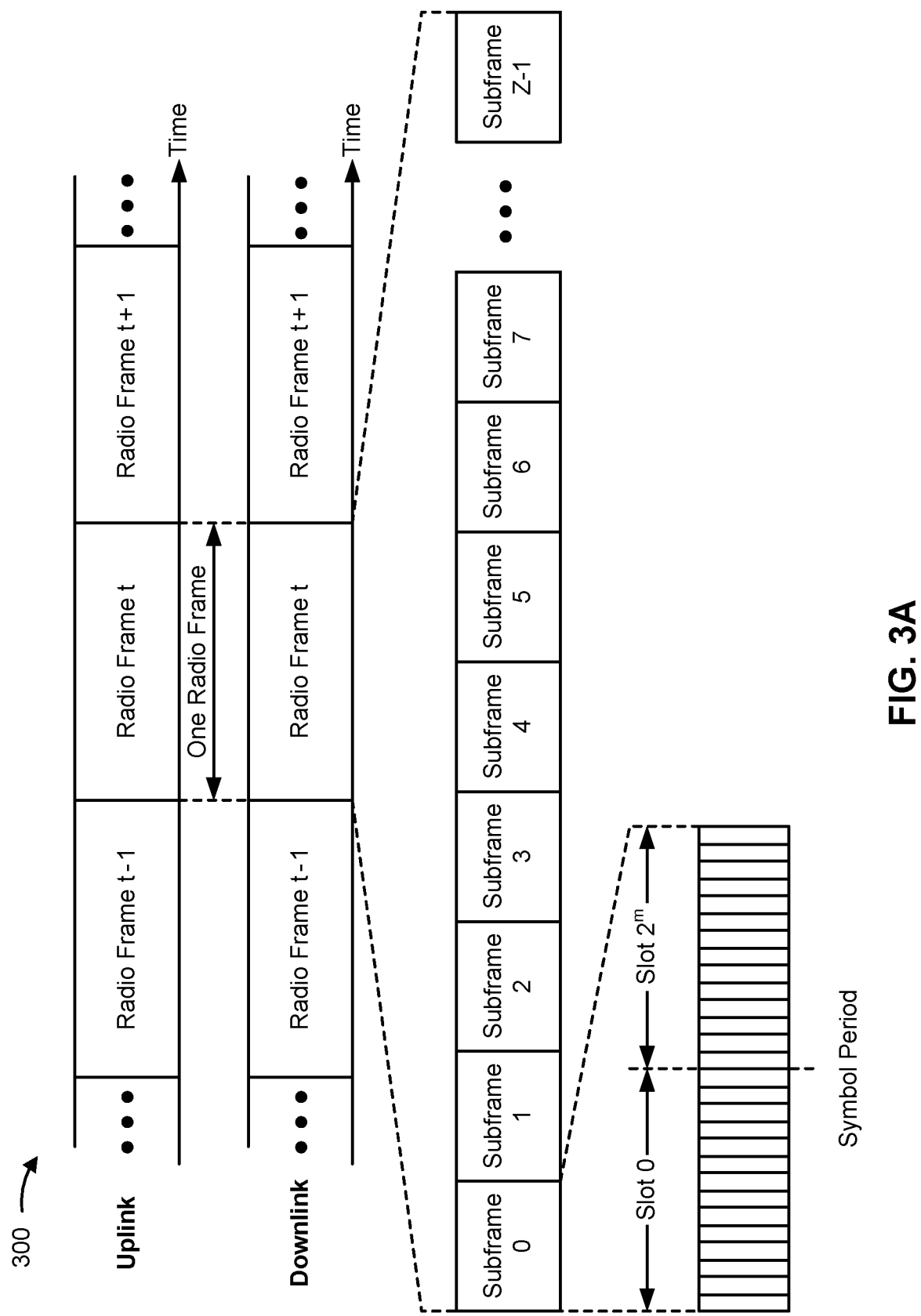
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z>1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
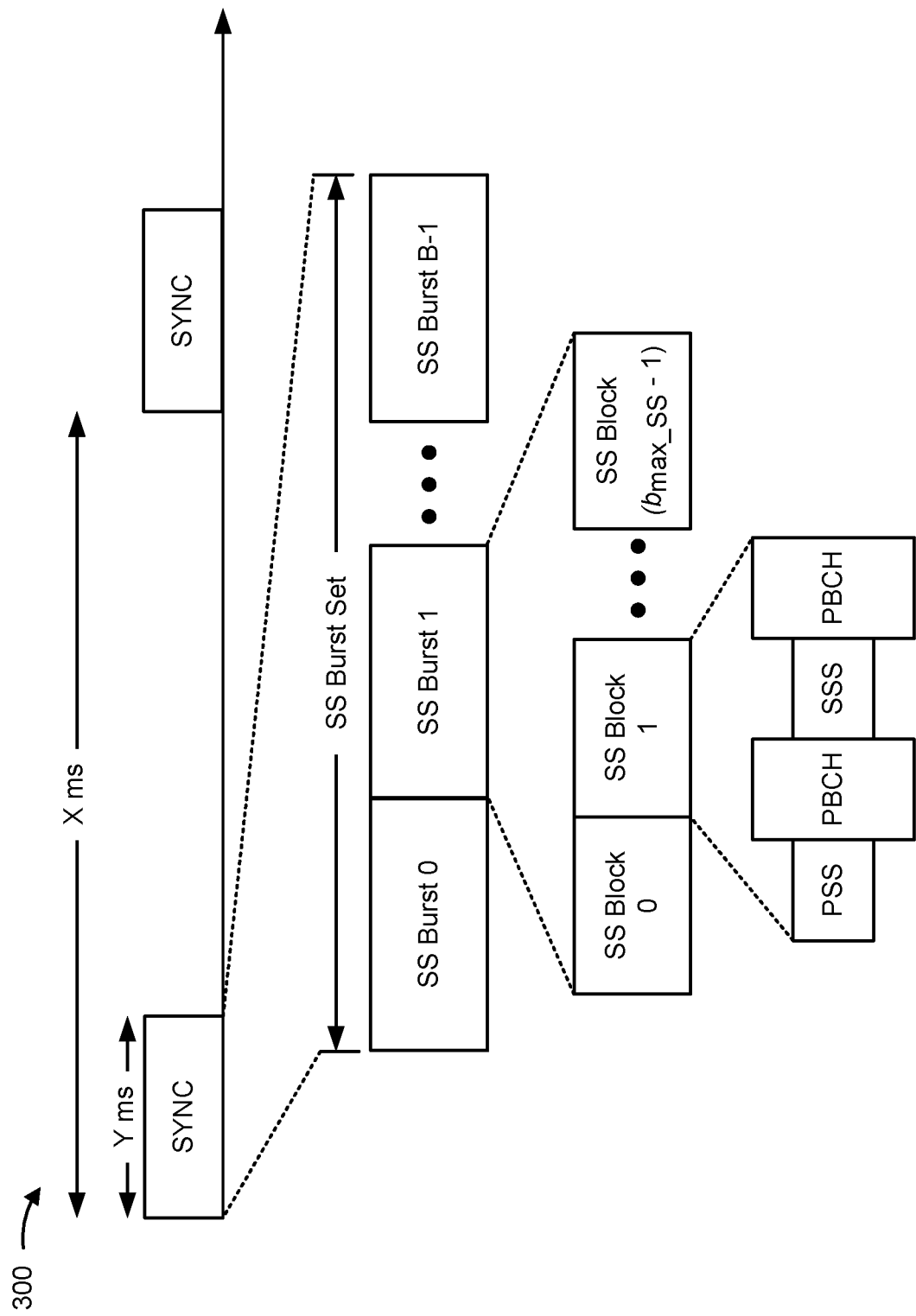
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot. In some aspects, the base station may configure one or more control resource sets (CORESETs) for a UE.

A CORESET may indicate time-domain and/or frequency-domain resources that carry PDCCH communications. The PDCCH communications may further schedule PDSCH communications. For example, a PBCH communication may specify or indicate a CORESET for RMSI and/or other system information (OSI), which may be transmitted on a PDSCH. A UE may identify the CORESET (e.g., CORESET0) indicated in the payload of the PBCH communication, may detect and decode one or more PDCCH communications associated with the RMSI and/or OSI to identify one or more parameters for the RMSI and/or OSI, and may detect and decode RMSI communications and/or OSI communications on the PDSCH based at least in part on the one or more parameters.

As indicated above, FIGS. 3A and 3B are provided as examples. Other examples may differ from what is described with regard to FIGS. 3A and 3B.

Figure 4:
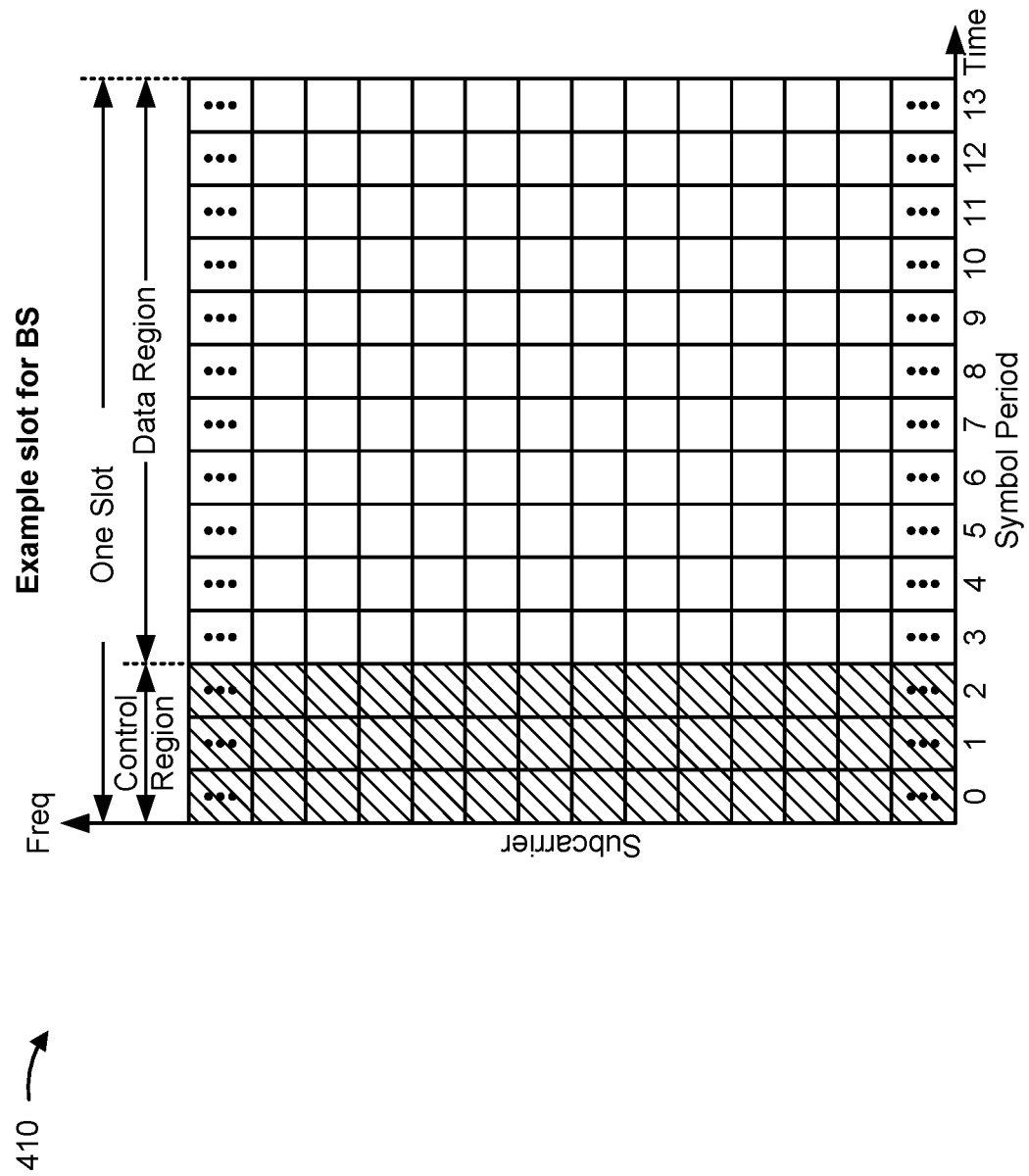
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems and/or access methods, such as NTN configurations and/or access methods. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data. In some aspects, DL/UL control data may be located in a control region or one or more CORESETs of a slot.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In NR, a PTRS was introduced for phase noise tracking and to compensate for phase noise in a transmitted signal, particularly a signal transmitted using a millimeter wave frequency. In a transmitter, the phase noise increases as the operating frequency increases. Phase noise is generated by a local oscillator in the transmitter, and may introduce constant or common phase error (CPE) or other phase noise errors into the transmitted signal, which degrades demodulation performance. The PTRS may be used to track phase noise in a local oscillator (e.g., in a transmitter and/or a receiver) and to suppress such phase noise, especially at millimeter wave frequencies.

A PTRS may be present and transmitted in a downlink data channel (e.g., a PDSCH) and/or an uplink data channel (e.g., a physical uplink shared channel (PUSCH)). Because PDSCH and PUSCH communications may be transmitted with high modulation and coding schemes (MCSs), which are more susceptible to degraded demodulation due to phase noise, the PTRS may be transmitted in the PDSCH and the PUSCH. For random access channel (RACH) communications, which may be transmitted as part of an initial access procedure, a lower or fixed MCS may be used, making RACH communications more robust against phase noise. Thus, to reduce signaling overhead, PTRS may not be transmitted during initial access.

However, some NR deployments may be subject to a large Doppler shift due to a high relative speed between a BS and a UE, such as an NTN deployment that uses non-stationary satellites as BSs (e.g., a low Earth orbit (LEO) satellite, a middle Earth orbit (MEO) satellite, and/or the like). This large Doppler shift increases the difficulty of channel estimation due to a frequency offset and/or a timing offset resulting from the large Doppler shift.

Some techniques and apparatuses described herein introduce a high Doppler configuration for initial access to assist with channel estimation and phase noise correction in such deployments. A BS (e.g., a non-stationary satellite in an NTN deployment) may configure one or more high Doppler configurations in which the BS may transmit one or more PTRSs for RMSI communications and/or OSI communications that are transmitted as part of the system information the BS transmits prior to and/or during initial access with the BS. Moreover, the BS may transmit an indication of whether a high Doppler configuration is activated, may transmit an indication of the high Doppler configuration (e.g., the one or more parameters for the high Doppler configuration), and/or the like. In this way, a UE that performs an initial access procedure with the BS may determine whether the UE is to use a high Doppler configuration for the initial access procedure, may identify the one or more parameters for the high Doppler configuration, and may use the one or more PTRSs transmitted from the BS to mitigate the effects of large Doppler shift due to the high relative speed between the BS and the UE. This increases demodulation performance for RMSI communications and/or OSI communications, which reduces latency, increases reliability, and improves network performance.

Figure 5A:
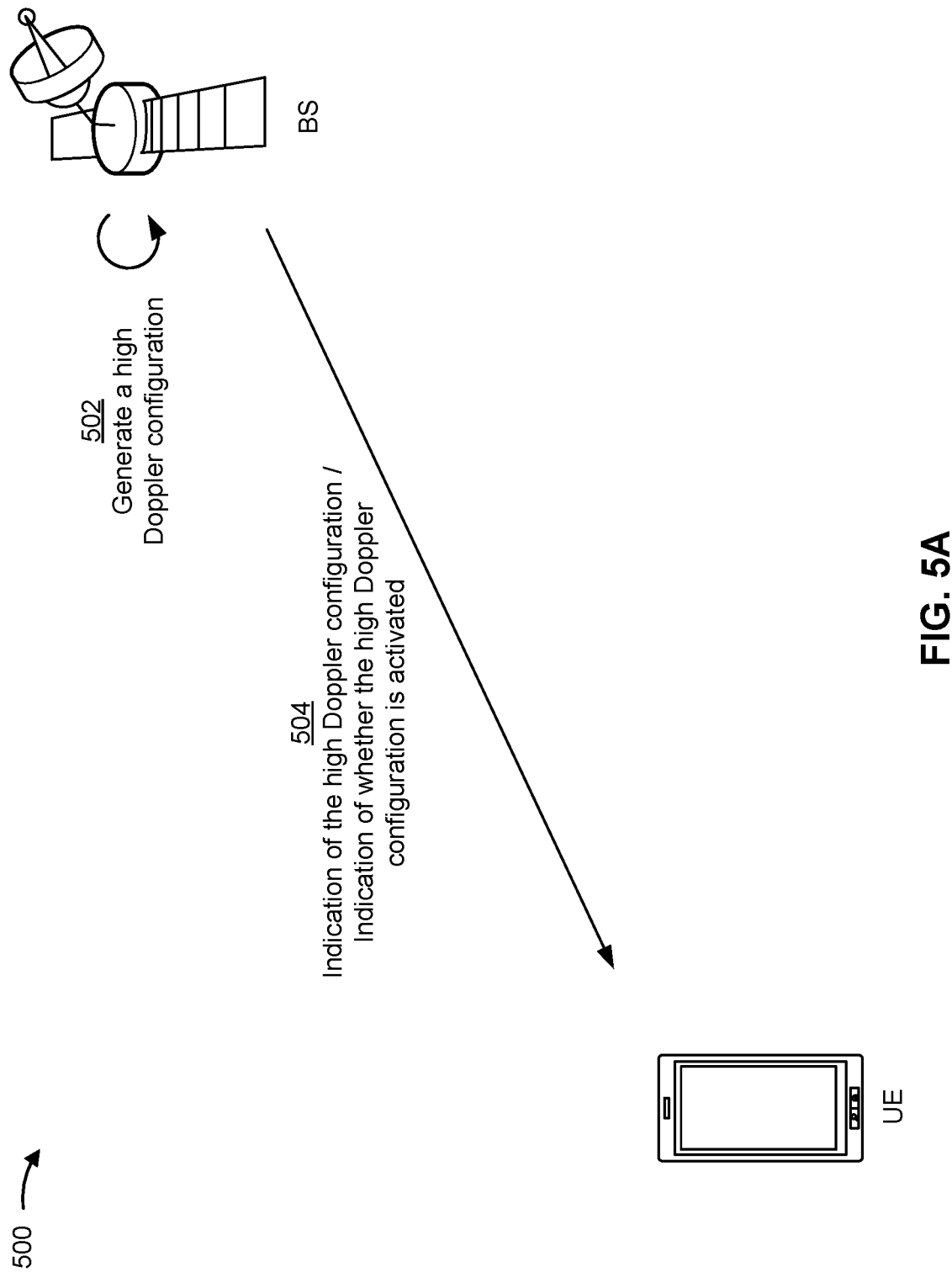
FIGS. 5A-5C are diagrams illustrating one or more examples of phase tracking for initial access, in accordance with various aspects of the present disclosure.
Figure 5B:
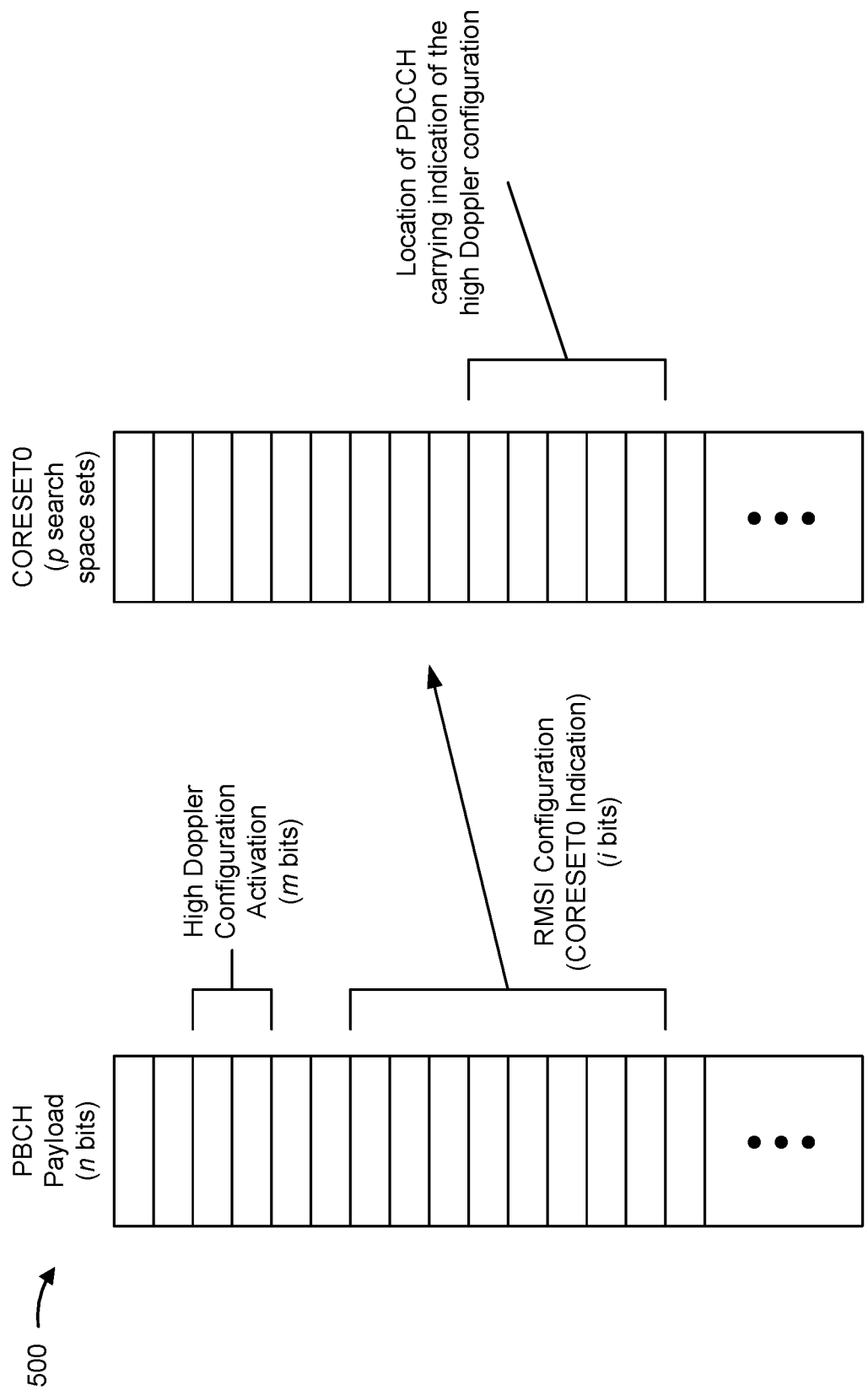
Figure 5C:
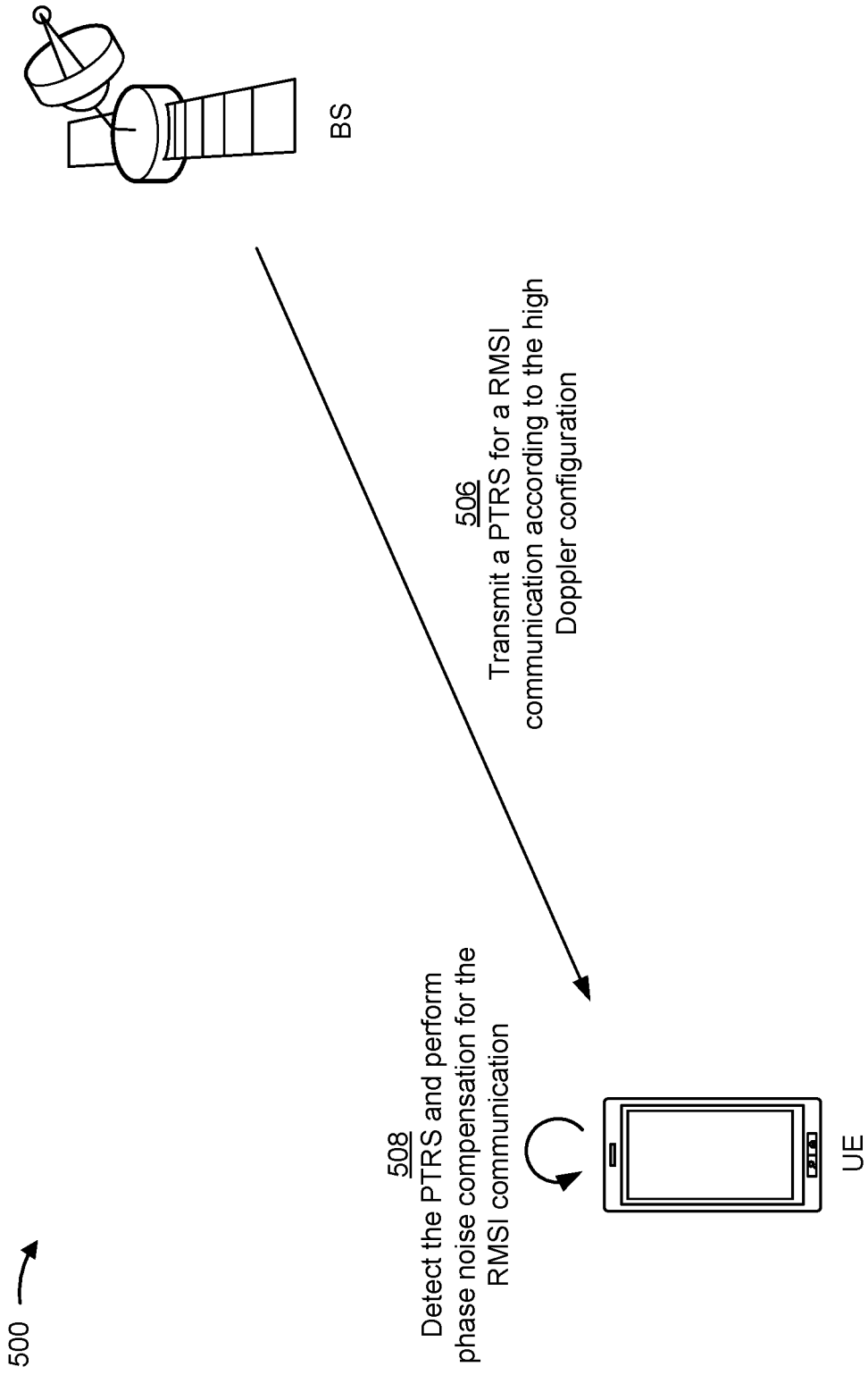

FIGS. 5A-5C are diagrams illustrating one or more examples 500 of phase tracking for initial access, in accordance with various aspects of the present disclosure. As shown in FIG. 5, examples 500 may include communication between a BS (e.g., BS 110) and a UE (e.g., UE 120). In some aspects, the BS may be included in an NTN deployment of a wireless network. In this case, the BS may be implemented by a non-stationary satellite that communicates directly with the UE via a satellite communication link and/or another type of non-terrestrial communication link. In some aspects, the BS and the UE may communicate using a frame structure, such as frame structure 300 illustrated in FIG. 3A and/or another frame structure.

Since the BS may be a non-stationary satellite that travels at a high speed relative to the UE (e.g., on the order of thousands of kilometers per second), this high speed of travel may cause a high Doppler shift to occur between the BS and the UE, which in turn may cause phase noise (e.g., fast phase variations in time and/or frequency) to occur on the satellite communication link.

As shown in FIG. 5A, and by reference number 502, to compensate for and/or mitigate the effects of the high Doppler shift, the BS may generate a high Doppler configuration for system information that is transmitted prior to and/or during initial access with the BS. The high Doppler configuration may configure, among other things, a PTRS for one or more types of system information communications that are typically not configured with a PTRS due to having a lower level MCS (e.g., quadrature phase shift keying (QPSK) and/or the like), such as RMSI communications, OSI communications, and/or the like. In this case, the BS may transmit the PTRS on a PDSCH.

In some aspects, the high Doppler configuration may indicate, include, and/or specify one or more parameters for communication during initial access with the BS, one or more parameters for communication prior to initial access with the BS, and/or the like. The one or more parameters may include one or more PTRS parameters for transmitting one or more PTRSs prior to and/or during initial access. In some aspects, the one or more PTRS parameters may include a parameter that indicates and/or specifies that the BS is to transmit a PTRS for RMSI communications that are transmitted prior to and/or during initial access, may include a parameter that indicates and/or specifies that the BS is to transmit a PTRS for OSI communications that are transmitted prior to and/or during initial access, and/or the like.

In some aspects, the one or more PTRS parameters may include a parameter that indicates and/or specifies a time density for a PTRS. The time density for a PTRS may specify a periodicity for transmitting a PTRS for RMSI communications, may specify a periodicity for transmitting a PTRS for OSI communications, and/or the like. In some aspects, the BS may determine the time density for a PTRS based at least in part on an MCS level for the corresponding type of communication. For example, the BS may determine the time density based at least in part on a mapping indicated in Table 1 below.

TABLE 1

| Scheduled MCS | Time density |
| --- | --- |
| $I_{MCS}$ < ptrs-MCS1 | j |
| ptrs-MCS1 < $I_{MCS}$ < ptrs-MCS2 | 4 |
| ptrs-MCS2 < $I_{MCS}$ < ptrs-MCS3 | 2 |
| ptrs-MCS3 < $I_{MCS}$ < ptrs-MCS4 | 1 |

In this case, the high Doppler configuration may index into the table or explicitly specify the time density (e.g., may identify an index, included in the table, associated with the time density). $I_{MCS}$ may correspond to the MCS of the system information communication and ptrs-MCS1-MSC4 may correspond to different levels of MCS. In some aspects, j may be a configurable value such that, if $I_{MCS}$<ptrs-MCS1 (e.g., which may be the case for RMSI communications and/or OSI communications), the BS may transmit a PTRS every j symbols. Example values for j may include 1, 2, 4, 8, and/or the like. As an example, if j=1, the BS may transmit a PTRS for RMSI communications every PDSCH symbol of a particular frequency (or set of frequencies) on the satellite communication link. In some aspects, the parameter that indicates and/or specifies a time density for a PTRS may further specify whether the PTRS is to be transmitted in symbols in which a DMRS is transmitted.

In some aspects, the one or more PTRS parameters may include a parameter that indicates and/or specifies a frequency density for a PTRS. The frequency density for a PTRS may specify a bandwidth for a PTRS for RMSI communications, may specify a bandwidth for a PTRS for OSI communications, and/or the like. In some aspects, the BS may determine the frequency density for a PTRS based at least in part on a bandwidth for the satellite communication link, based at least in part on a system bandwidth associated with the BS, and/or the like. For example, the BS may determine the frequency density based at least in part on a mapping indicated in Table 2 below.

TABLE 2

| Contiguous Scheduled BW | Frequency density |
| --- | --- |
| $N_{RB}$ < $N_{RB0}$ | k |
| $N_{RB0}$ < $N_{RB}$ < $N_{RB1}$ | 2 |
| $N_{RB1}$ < $N_{RB}$ | 4 |

In this case, the high Doppler configuration may index into the table or explicitly specify the frequency density (e.g., may identify an index, included in the table, associated with the frequency density). $N_{RB}$ may correspond to the system bandwidth of the BS (e.g., in a quantity of resource blocks (RBs)) and $N_{RB0}$ and $N_{RB1}$ may correspond to different bandwidth thresholds. In some aspects, k may be a configurable value such that, if $N_{RB}$<$N_{RB0}$, the BS may transmit a PTRS across k RBs. Example values for k may include 1, 2, and/or the like.

In some aspects, the one or more PTRS parameters may include a parameter that indicates and/or specifies whether the BS is to use the same time density and/or frequency density for PTRSs that are transmitted for different RMSI communications and/or different OSI communications. In some aspects, the one or more PTRS parameters may include a parameter that indicates and/or specifies whether a scrambling identifier is to be used to scramble a PTRS and/or a type of scrambling identifier that is to be used to scramble the PTRS. The scrambling identifier may include, for example, a cell-specific identifier associated with the BS, a group-specific identifier associated with the UE (e.g., random access radio network temporary identifier (RA-RNTI), a group common radio network temporary identifier (GC-RNTI), and/or the like), and/or the like. In some aspects, one or more PTRS parameters may include a parameter that indicates and/or specifies a PTRS sequence mapping for a PTRS, a PTRS sequence modulation scheme for the PTRS, and/or the like. For example, the PTRS sequence mapping may include mapping a PTRS sequence (e.g., a Gold sequence, a Zadoff-Chu sequence, and/or the like) first and a time-domain resource second, may include mapping the time-domain resource first and the PTRS sequence second, and/or the like.

In some aspects, the high Doppler configuration may indicate, include, and/or specify a DMRS parameter for transmitting DMRS prior to and/or during initial access with the BS. The DMRS parameter may indicate and/or specify whether the BS is to transmit additional DMRSs (e.g., two additional DMRSs, three additional DMRSs, and/or the like) prior to and/or during initial access with the BS, which may be used by UEs to further assist in channel estimation prior to and/or during initial access with the BS.

In some aspects, the high Doppler configuration may indicate, include, and/or specify one or more sub-carrier spacing (SCS) parameters. For example, the one or more SCS parameters may indicate and/or specify an SCS for one or more PBCHs associated with the BS, an SCS for one or more RMSI communications transmitted by the BS, an SCS for one or more OSI communication transmitted by the BS, and/or the like. In some aspects, the SCS for the one or more PBCHs, the SCS for the one or more RMSI communications, and/or the SCS for the one or more OSI communications may be the same SCS or different SCSs.

In some aspects, the high Doppler configuration may explicitly specify the one or more SCS parameters. For example, the high Doppler configuration may specify that an SCS of 60 kHz is to be used with sub-6-GHz frequencies, may specify that an SCS of 240 kHz is to be used with mmW frequencies, and/or the like. In some aspects, the high Doppler configuration may implicitly specify the one or more SCS parameters. For example, the high Doppler configuration may specify that the SCS of 60 kHz is to be used with sub-6-GHz frequencies, may specify that the highest SCS permitted to be used is configured for the high Doppler configuration to decrease the effects of high Doppler shift between the UE and the BS, and/or the like.

As further shown in FIG. 5A, and by reference number 504, the BS may transmit, to the UE, an indication of the high Doppler configuration and an indication of whether the high Doppler configuration is activated. In some aspects, the BS may transmit the indication of the high Doppler configuration and/or the indication of whether the high Doppler configuration is activated in various types of communications. For example, the BS may transmit the indication of the high Doppler configuration in a PBCH communication, a PDCCH communication (e.g., a radio resource control (RRC) communication, a downlink control information (DCI) communication, and/or the like), and/or the like. As another example, the BS may transmit the indication of whether the high Doppler configuration is activated in a PBCH communication, in an SSS transmission, and/or the like. In this case, the indication of whether the high Doppler configuration is activated may be included in one or more bits in a payload of a PBCH communication (e.g., one or more reserved bits), may correspond to a cell identifier associated with the BS and indicated in an SSS transmission (e.g., the cell identifier may be included in a group of cell identifiers that is associated with activated high Doppler configurations), and/or the like.

In some aspects, the BS may generate a plurality of candidate high Doppler configurations. In this case, the BS may transmit an indication of the plurality of high Doppler configurations and an indication of which high Doppler configuration is to be used. In this case, the BS may transmit an indication of the plurality of candidate high Doppler configurations in an RRC communication and may transmit an indication of the selected high Doppler configuration in a DCI communication. In this way, the BS is permitted to dynamically switch between different high Doppler configurations (e.g., for different threshold amounts of Doppler shift).

In some aspects, the indication of the high Doppler configuration and the indication of whether the high Doppler configuration is activated may be included in the same indication. For example, a plurality of bits in a payload of a PBCH communication may be used to indicate which high Doppler configuration of the plurality of candidate high Doppler configurations is activated. As an example, the BS may configure two reserve bits (e.g., 00) to indicate that no high Doppler configuration is activated (e.g., if no Doppler shift thresholds are satisfied), may configure the two reserve bits (e.g., 01) to indicate that a first high Doppler configuration is activated (e.g., if the Doppler shift between the BS and the UE satisfies a first Doppler shift threshold), may configure the two reserve bits (e.g., 10) to indicate that a second high Doppler configuration is activated (e.g., if the Doppler shift between the BS and the UE satisfies the first Doppler shift threshold and a second Doppler shift threshold), and so on.

Additionally and/or alternatively, the BS may be configured with a plurality of candidate cell identifiers that the BS may use to indicate which high Doppler configuration of the plurality of candidate high Doppler configurations is activated. In this case, each candidate cell identifier may be associated with a respective candidate high Doppler configuration.

FIG. 5B illustrates an example configuration for indicating a high Doppler configuration and indicating whether the high Doppler configuration is activated. Other example configurations may be implemented.

As shown in FIG. 5B, the BS may transmit a PBCH communication that includes a payload of n bits. The payload may include m bits that carry the indication that the high Doppler configuration is activated. Moreover, the payload may include i bits that carry an indication of an RMSI configuration. The RMSI configuration may include an indication of a CORESET for transmitting RMSI communications (e.g., CORSET0).

The CORESET0 may specify p search space sets (e.g., which may include respective and/or overlapping time-domain locations, frequency-domain locations, and/or the like) in which PDCCH communications may be transmitted. The UE may monitor the search space sets for PDCCH communications that carry the control portion of the RMSI communications that are transmitted by the BS. The control portion of the RMSI communications may include the indication of the high Doppler configuration, may include an indication of the locations of the RMSI communications in PDSCH communications, and/or the like.

As shown in FIG. 5C, and by reference number 506, if a high Doppler configuration is activated, the BS may transmit a PTRS for an RMSI communication according to the high Doppler configuration (e.g., according to the one or more PTRS parameters indicated and/or specified in the high Doppler configuration). Moreover, the BS may transmit a PTRS for an OSI communication according to the high Doppler configuration (e.g., according to the one or more PTRS parameters indicated and/or specified in the high Doppler configuration), may transmit PBCH communications and/or RMSI communications according to the one or more SCS parameters indicated and/or specified in the high Doppler configuration, may transmit one or more DMRSs according to the DMRS parameter indicated and/or specified in the high Doppler configuration, and/or the like.

As further shown in FIG. 5C, and by reference number 508, if the UE determines that a high Doppler configuration is activated (e.g., based at least in part on receiving an indication that the high Doppler configuration is activated), the UE may detect a PTRS transmitted for an RMSI communication and may perform phase noise compensation for the RMSI communication based at least in part on the PTRS. For example, the UE may perform one or more phase tracking measurements based at least in part on the PTRS to determine an amount of phase noise on the satellite communication link, and may compensate for the phase noise when demodulating and/or decoding the RMSI communication. Moreover, the UE may perform similar phase noise corrections for OSI communications if the BS transmits a PTRS for the OSI communications.

In this way, the BS (e.g., a non-stationary satellite in an NTN deployment) may configure one or more high Doppler configurations in which the BS may transmit one or more PTRSs for RMSI communications and/or OSI communications that are transmitted as part of the system information the BS transmits prior to and/or during initial access with the BS. Moreover, the BS may transmit an indication of whether a high Doppler configuration is activated, may transmit an indication of the high Doppler configuration (e.g., the one or more parameters for the high Doppler configuration), and/or the like. In this way, if a UE performs an initial access procedure with the BS, the UE may determine whether the UE is to use a high Doppler configuration for the initial access procedure, may identify the one or more parameters for the high Doppler configuration, and may use the one or more PTRSs transmitted from the BS to mitigate the effects of large Doppler shift due to the high relative speed between the BS and the UE. This improves demodulation performance for RMSI communications and/or OSI communications, which reduces latency, increases reliability, and improves network performance.

As indicated above, FIGS. 5A-5C are provided as examples. Other examples may differ from what is described with respect to FIGS. 5A-5C.

Figure 6:
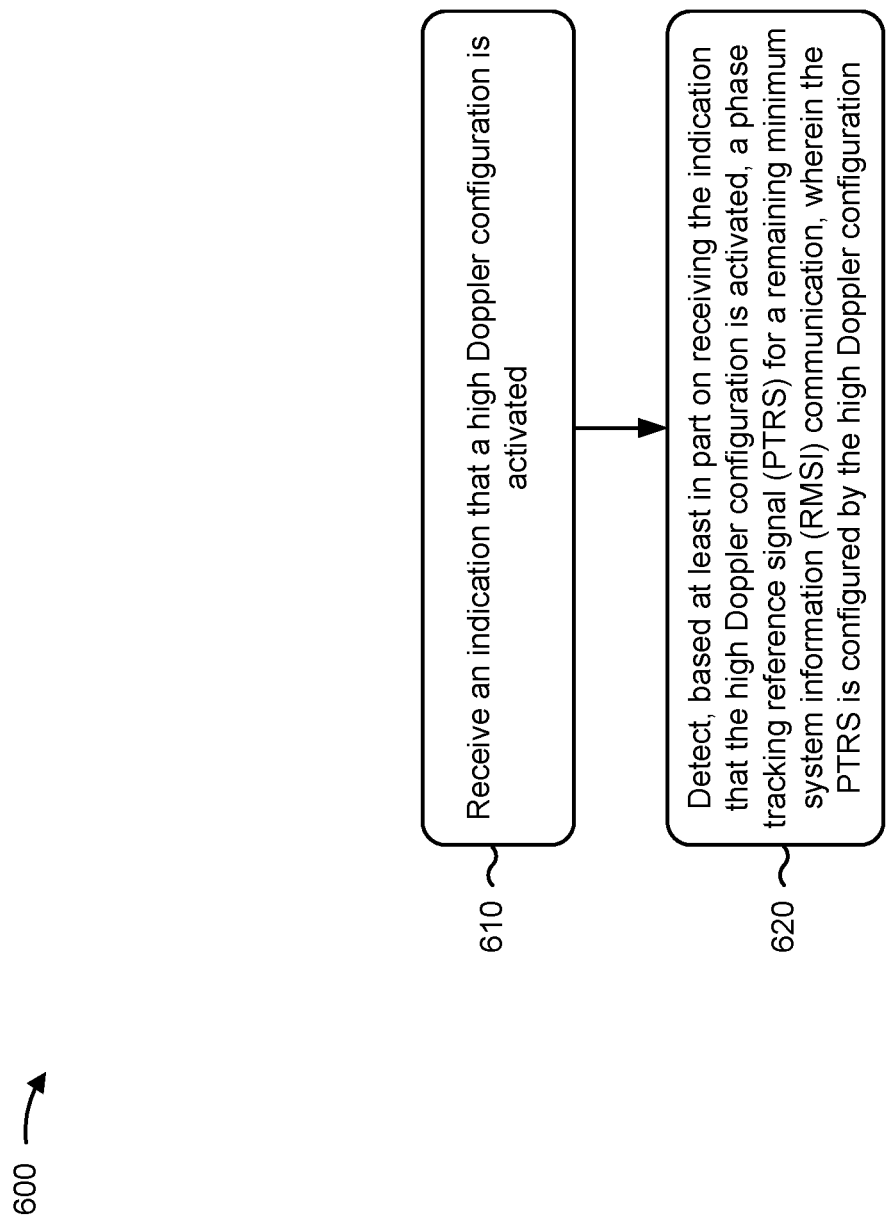
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with phase tracking for initial access.

As shown in FIG. 6, in some aspects, process 600 may include receiving an indication that a high Doppler configuration is activated (block 610). For example, the UE (e.g., using receive processor 258, transmit processor 264, controller/processor 280, memory 282, and/or the like) may receive an indication that a high Doppler configuration is activated, as described above.

As further shown in FIG. 6, in some aspects, process 600 may include detecting, based at least in part on receiving the indication that the high Doppler configuration is activated, a PTRS for an RMSI communication wherein the PTRS is configured by the high Doppler configuration (block 620). For example, the UE (e.g., using receive processor 258, transmit processor 264, controller/processor 280, memory 282, and/or the like) may detect, based at least in part on receiving the indication that the high Doppler configuration is activated, a PTRS for an RMSI communication wherein the PTRS is configured by the high Doppler configuration, as described above. In some aspects, the PTRS is configured by the high Doppler configuration.

Process 600 may include additional aspects, such as any single aspect or any combination of aspects described below and/or in connection with one or more other processes described elsewhere herein.

In a first aspect, the high Doppler configuration is configured for initial access, and detecting the PTRS comprises detecting the PTRS during an initial access procedure. In a second aspect, alone or in combination with the first aspect, process 600 further comprises receiving an indication of the high Doppler configuration in at least one of a PBCH communication, an RRC communication, or a DCI communication. In a third aspect, alone or in combination with one or more of the first and second aspects, the high Doppler configuration includes one or more parameters for at least one of prior to or during initial access, and the one or more parameters comprise at least one of a parameter that specifies an SCS for at least one of a PBCH, the RMSI communication, or an OSI communication, a parameter that specifies that one or more additional DMRSs are to be transmitted for at least one of the RMSI communication or the OSI communication, or one or more PTRS parameters for the PTRS.

In a fourth aspect, alone or in combination with one or more of the first through third aspects, the high Doppler configuration includes a parameter that indicates an SCS for a PBCH and an SCS for the RMSI communication for at least one of prior to or during initial access, the SCS for the PBCH in the high Doppler configuration is a greatest SCS for the PBCH for a frequency range associated with a BS, and the SCS for the RMSI communication in the high Doppler configuration is a greatest SCS for the RMSI communication for a frequency range associated with the BS.

In a fifth aspect, alone or in combination with one or more of the first through fourth aspects, the high Doppler configuration includes one or more PTRS parameters for the PTRS, and the one or more PTRS parameters comprise at least one of a parameter that indicates that the PTRS is to be transmitted for at least one of the RMSI communication or an OSI communication, a parameter that indicates a time density for the PTRS, a parameter that indicates a frequency density for the PTRS, a parameter that indicates a scrambling identifier for the PTRS, a parameter that indicates that the one or more PTRS parameters are to be used with other RMSI communications and other OSI communications, a parameter that indicates a PTRS sequence mapping for the PTRS, a parameter that indicates a PTRS sequence initial phase for the PTRS, or a parameter that indicates a PTRS sequence modulation scheme for the PTRS. In a sixth aspect, alone or in combination with one or more of the first through fifth aspects, the parameter that indicates the time density for the PTRS and the parameter that indicates the frequency density for the PTRS identify an index included in one or more PTRS density tables.

In a seventh aspect, alone or in combination with one or more of the first through sixth aspects, the parameter that indicates the time density for the PTRS specifies that the PTRS is to be transmitted on all PDSCH symbols associated with a BS or a subset of the PDSCH symbols associated with the BS. In an eighth aspect, alone or in combination with one or more of the first through seventh aspects, the scrambling identifier for the PTRS comprises a cell-specific identifier or a group-specific identifier. In a ninth aspect, alone or in combination with one or more of the first through eighth aspects, process 600 further comprises receiving an indication of the high Doppler configuration in a PDCCH communication in a CORESET associated with the RMSI communication.

In a tenth aspect, alone or in combination with one or more of the first through ninth aspects, the indication that the high Doppler configuration is activated is included in one or more bits of a PBCH. In an eleventh aspect, alone or in combination with one or more of the first through tenth aspects, the indication that the high Doppler configuration is activated, and an indication of one or more parameters for the high Doppler configuration, is included in one or more bits of a PBCH. In a twelfth aspect, alone or in combination with one or more of the first through eleventh aspects, the one or more parameters comprise a Doppler range for the high Doppler configuration and a PTRS configuration for the high Doppler configuration.

In a thirteenth aspect, alone or in combination with one or more of the first through twelfth aspects, the high Doppler configuration is included in a plurality of candidate high Doppler configurations, process 600 further comprises receiving an indication of the plurality of candidate high Doppler configurations in an RRC communication, and receiving the indication that the high Doppler configuration is activated comprises receiving the indication that the high Doppler configuration is activated in a DCI communication. In a fourteenth aspect, alone or in combination with one or more of the first through thirteenth aspects, process 600 further comprises receiving an indication of the high Doppler configuration in a DCI communication, and the high Doppler configuration overrides another high Doppler configuration received in an RRC communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
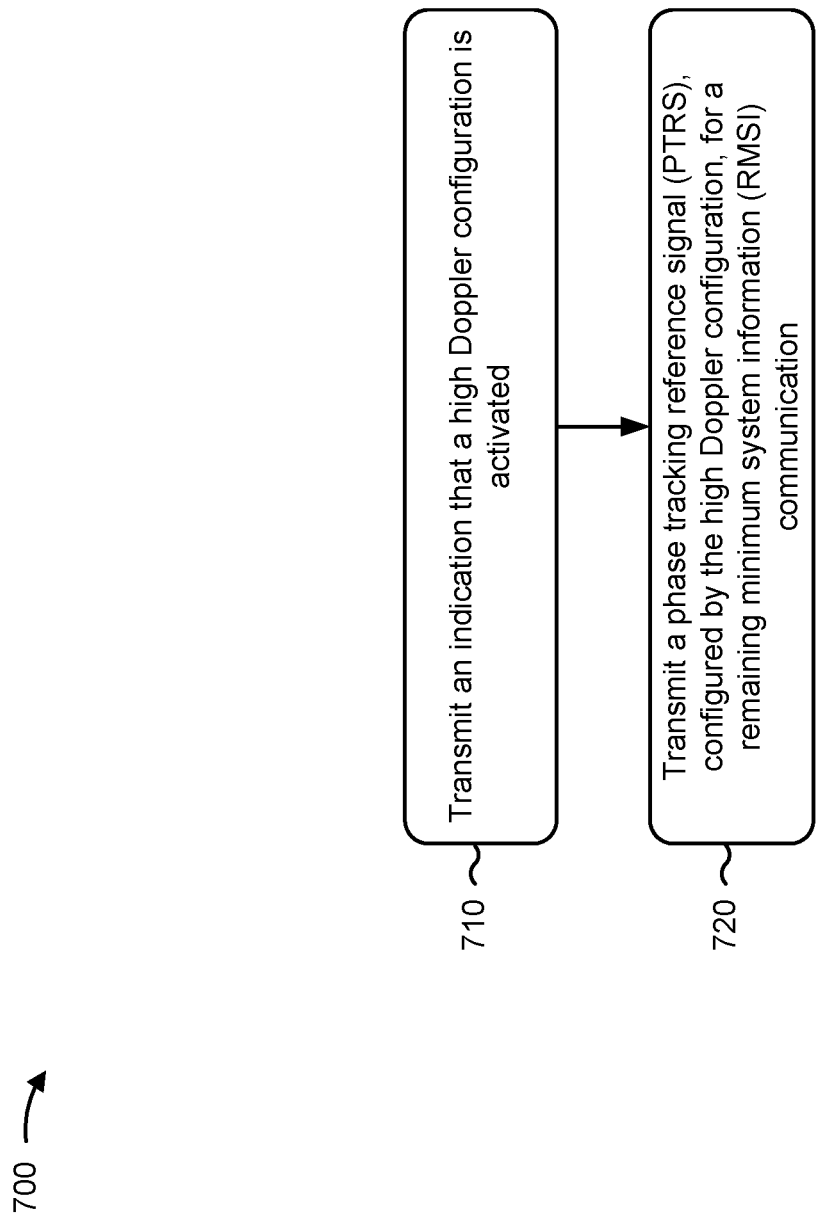
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with phase tracking for initial access.

As shown in FIG. 7, in some aspects, process 700 may include transmitting an indication that a high Doppler configuration is activated (block 710). For example, the BS (e.g., using transmit processor 220, receive processor 238, controller/processor 240, memory 242, and/or the like) may transmit an indication that a high Doppler configuration is activated, as described above.

As further shown in FIG. 7, in some aspects, process 700 may include transmitting a PTRS, configured by the high Doppler configuration, for an RMSI communication (block 720). For example, the BS (e.g., using transmit processor 220, receive processor 238, controller/processor 240, memory 242, and/or the like) may transmit a PTRS, configured by the high Doppler configuration, for an RMSI communication, as described above.

Process 700 may include additional aspects, such as any single aspect or any combination of aspects described below and/or in connection with one or more other processes described elsewhere herein.

In a first aspect, process 700 further comprises configuring the high Doppler configuration for initial access with the BS. In a second aspect, alone or in combination with the first aspect, process 70 further comprises transmitting an indication of the high Doppler configuration in at least one of a PBCH communication, an RRC communication, or a DCI communication. In a third aspect, alone or in combination with one or more of the first and second aspects, the high Doppler configuration includes one or more parameters for initial access, and the one or more parameters comprise at least one of a parameter that specifies an SCS for at least one of a PBCH, the RMSI communication, or an OSI communication, a parameter that specifies that one or more additional DMRSs are to be transmitted for at least one of the RMSI communication or the OSI communication, or one or more PTRS parameters for the PTRS.

In a fourth aspect, alone or in combination with one or more of the first through third aspects, the high Doppler configuration includes a parameter that indicates an SCS for a PBCH and an SCS for the RMSI communication for at least one of prior to or during initial access, and the SCS for the PBCH in the high Doppler configuration is a greatest SCS for the PBCH for a frequency range associated with the BS. In some aspects, the SCS for the RMSI communication in the high Doppler configuration is a greatest SCS for the RMSI communication for a frequency range associated with the BS. In a fifth aspect, alone or in combination with one or more of the first through fourth aspects, the high Doppler configuration includes one or more PTRS parameters for the PTRS, and the one or more PTRS parameters comprise at least one of a parameter that indicates that the PTRS is to be transmitted for at least one of the RMSI communication or an OSI communication during initial access, a parameter that indicates a time density for the PTRS, a parameter that indicates a frequency density for the PTRS, a parameter that indicates a scrambling identifier for the PTRS, a parameter that indicates that the one or more PTRS parameters are to be used with other RMSI communications and other OSI communications, a parameter that indicates a PTRS sequence mapping for the PTRS, a parameter that indicates a PTRS sequence initial phase for the PTRS, or a parameter that indicates a PTRS sequence modulation scheme for the PTRS.

In a sixth aspect, alone or in combination with one or more of the first through fifth aspects, the parameter that indicates the time density for the PTRS and the parameter that indicates the frequency density for the PTRS identifies an index included in one or more PTRS density tables. In a seventh aspect, alone or in combination with one or more of the first through sixth aspects, the parameter that indicates the time density for the PTRS specifies that the PTRS is to be transmitted on every PDSCH symbol associated with the BS, or a subset of the PDSCH symbols. In an eighth aspect, alone or in combination with one or more of the first through seventh aspects, the scrambling identifier for the PTRS comprises a cell-specific identifier or a group-specific identifier. In a ninth aspect, alone or in combination with one or more of the first through eighth aspects, process 700 further comprises transmitting an indication of the high Doppler configuration in a PDCCH communication in a CORESET associated with the RMSI communication.

In a tenth aspect, alone or in combination with one or more of the first through ninth aspects, transmitting the indication that the high Doppler configuration is activated comprises transmitting the indication that the high Doppler configuration is activated in one or more bits of a PBCH. In an eleventh aspect, alone or in combination with one or more of the first through tenth aspects, transmitting the indication that the high Doppler configuration is activated comprises: transmitting the indication that the high Doppler configuration is activated, and an indication of one or more parameters for the high Doppler configuration, in one or more bits of a PBCH. In a twelfth aspect, alone or in combination with one or more of the first through eleventh aspects, the one or more parameters comprise a Doppler range for the high Doppler configuration and a PTRS configuration for the high Doppler configuration.

In a thirteenth aspect, alone or in combination with one or more of the first through twelfth aspects, process 700 further comprises transmitting an indication of the high Doppler configuration in an RRC communication, and transmitting the indication that the high Doppler configuration is activated comprises transmitting the indication that the high Doppler configuration is activated in a DCI communication. In a fourteenth aspect, alone or in combination with one or more of the first through thirteenth aspects, process 700 further comprises transmitting an indication of the high Doppler configuration in a DCI communication, and the high Doppler configuration overrides another high Doppler configuration that was transmitted in an RRC communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication that a high Doppler configuration is activated; and
   detecting, based at least in part on receiving the indication that the high Doppler configuration is activated, a phase tracking reference signal (PTRS) for a remaining minimum system information (RMSI) communication,
   wherein the PTRS is configured by the high Doppler configuration.

2. The method of claim 1, wherein the high Doppler configuration is configured for initial access; and
   wherein detecting the PTRS comprises:
   detecting the PTRS during an initial access procedure.

3. The method of claim 1, further comprising:
   receiving an indication of the high Doppler configuration in at least one of:
   a physical broadcast channel (PBCH) communication,
   a radio resource control (RRC) communication, or
   a downlink control information (DCI) communication.

4. The method of claim 1, wherein the high Doppler configuration includes one or more parameters for at least one of prior to or during initial access,
   wherein the one or more parameters comprise at least one of:
   a parameter that specifies a sub-carrier spacing (SCS) for at least one of a physical broadcast channel (PBCH), the RMSI communication, or an other system information (OSI) communication,
   a parameter that specifies that one or more additional demodulation reference signals (DMRSs) are to be transmitted for at least one of the RMSI communication or the OSI communication, or
   one or more PTRS parameters for the PTRS.

5. The method of claim 1, wherein the high Doppler configuration includes a parameter that indicates a sub-carrier spacing (SCS) for a physical broadcast channel (PBCH) and an SCS for the RMSI communication for at least one of prior to or during initial access,
   wherein the SCS for the PBCH in the high Doppler configuration is a greatest SCS for the PBCH for a frequency range associated with a base station (BS); and
   wherein the SCS for the RMSI communication in the high Doppler configuration is a greatest SCS for the RMSI communication for a frequency range associated with the BS.

6. The method of claim 1, wherein the high Doppler configuration includes one or more PTRS parameters for the PTRS,
   wherein the one or more PTRS parameters comprise at least one of:
   a parameter that indicates that the PTRS is to be transmitted for at least one of the RMSI communication or an other system information (OSI) communication,
   a parameter that indicates a time density for the PTRS,
   a parameter that indicates a frequency density for the PTRS,
   a parameter that indicates a scrambling identifier for the PTRS,
   a parameter that indicates that the one or more PTRS parameters are to be used with other RMSI communications and other OSI communications,
   a parameter that indicates a PTRS sequence mapping for the PTRS,
   a parameter that indicates a PTRS sequence initial phase for the PTRS, or
   a parameter that indicates a PTRS sequence modulation scheme for the PTRS.

7. The method of claim 6, wherein the parameter that indicates the time density for the PTRS and the parameter that indicates the frequency density for the PTRS identify an index included one or more PTRS density tables.

8. The method of claim 6, wherein the parameter that indicates the time density for the PTRS specifies that the PTRS is to be transmitted on:
   all physical downlink shared channel (PDSCH) symbol associated with a base station (BS), or
   a subset of the PDSCH symbols associated with the BS.

9. The method of claim 6, wherein the scrambling identifier for the PTRS comprises:
   a cell-specific identifier, or
   a group-specific identifier.

10. A user equipment (UE) for wireless communication, comprising:
    a memory; and
    one or more processors operatively coupled to the memory, the memory and the one or more processors configured to:

receive an indication that a high Doppler configuration is activated; and detect, based at least in part on receiving the indication that the high Doppler configuration is activated, a phase tracking reference signal (PTRS) for a remaining minimum system information (RMSI) communication, wherein the PTRS is configured by the high Doppler configuration.

11. The UE of claim 10, wherein the one or more processors are further configured to:

receive an indication of the high Doppler configuration in a physical downlink control channel (PDCCH) communication in a control resource set (CORESET) associated with the RMSI communication.

12. The UE of claim 10, wherein the indication that the high Doppler configuration is activated is included in one or more bits of a physical broadcast channel (PBCH).

13. The UE of claim 10, wherein the indication that the high Doppler configuration is activated, and an indication of one or more parameters for the high Doppler configuration, are included in one or more bits of a physical broadcast channel (PBCH); and wherein the one or more parameters comprise at least one of:

a Doppler range for the high Doppler configuration, or a PTRS configuration for the high Doppler configuration.

14. The UE of claim 10, wherein the high Doppler configuration is included in a plurality of candidate high Doppler configurations;

wherein the one or more processors are further configured to:

receive an indication of the plurality of candidate high Doppler configurations in a radio resource control (RRC) communication; and wherein the one or more processors, when receiving the indication that the high Doppler configuration is activated, are configured to:

receive the indication that the high Doppler configuration is activated in a downlink control information (DCI) communication.

15. The UE of claim 10, wherein the one or more processors are further configured to:

receive an indication of the high Doppler configuration in a downlink control information (DCI) communication, wherein the high Doppler configuration overrides another high Doppler configuration received in a radio resource control (RRC) communication.

16. A method of wireless communication performed by a base station (BS), comprising:

transmitting an indication that a high Doppler configuration is activated; and transmitting a phase tracking reference signal (PTRS), configured by the high Doppler configuration, for a remaining minimum system information (RMSI) communication.

17. The method of claim 16, further comprising:

configuring the high Doppler configuration for initial access with the BS.

18. The method of claim 16, wherein the high Doppler configuration includes one or more parameters for initial access, wherein the one or more parameters comprise at least one of:

a parameter that specifies a sub-carrier spacing (SCS) for at least one of a physical broadcast channel (PBCH), the RMSI communication, or an other system information (OSI) communication, a parameter that specifies that one or more additional demodulation reference signals (DMRSs) are to be transmitted for at least one of the RMSI communication or the OSI communication, or one or more PTRS parameters for the PTRS.

19. The method of claim 16, wherein the high Doppler configuration includes a parameter that indicates a sub-carrier spacing (SCS) for a physical broadcast channel (PBCH) and an SCS for the RMSI communication for at least one of prior to or during initial access, wherein the SCS for the PBCH in the high Doppler configuration is a greatest SCS for the PBCH for a frequency range associated with the BS; and wherein the SCS for the RMSI communication in the high Doppler configuration is a greatest SCS for the RMSI communication for a frequency range associated with the BS.

20. The method of claim 16, wherein the high Doppler configuration includes one or more PTRS parameters for the PTRS, wherein the one or more PTRS parameters comprise at least one of:

a parameter that indicates that the PTRS is to be transmitted for at least one of the RMSI communication or an other system information (OSI) communication during initial access, a parameter that indicates a time density for the PTRS, a parameter that indicates a frequency density for the PTRS, a parameter that indicates a scrambling identifier for the PTRS, a parameter that indicates that the one or more PTRS parameters are to be used with other RMSI communications and other OSI communications, a parameter that indicates a PTRS sequence mapping for the PTRS, a parameter that indicates a PTRS sequence initial phase for the PTRS, or a parameter that indicates a PTRS sequence modulation scheme for the PTRS.

21. The method of claim 20, wherein the parameter that indicates the time density for the PTRS and the parameter that indicates the frequency density for the PTRS identify an index included in one or more PTRS density tables.

22. The method of claim 20, wherein the parameter that indicates the time density for the PTRS specifies that the PTRS is to be transmitted on:

every physical downlink shared channel (PDSCH) symbol associated with the BS, or a subset of the PDSCH symbols.

23. The method of claim 20, wherein the scrambling identifier for the PTRS comprises:

a cell-specific identifier, or a group-specific identifier.

24. A base station (BS) for wireless communication, comprising:

a memory; and one or more processors operatively coupled to the memory, the memory and the one or more processors configured to:

transmit an indication that a high Doppler configuration is activated; and transmit a phase tracking reference signal (PTRS), configured by the high Doppler configuration, for a remaining minimum system information (RMSI) communication.

25. The BS of claim 24, wherein the one or more processors are further configured to:
   transmit an indication of the high Doppler configuration in a physical downlink control channel (PDCCH) communication in a control resource set (CORESET) associated with the RMSI communication.

26. The BS of claim 24, wherein the one or more processors, when transmitting the indication that the high Doppler configuration is activated, are configured to:
   transmit the indication that the high Doppler configuration is activated in one or more bits of a physical broadcast channel (PBCH).

27. The BS of claim 24, wherein the one or more processors, when transmitting the indication that the high Doppler configuration is activated, are configured to:
   transmit the indication that the high Doppler configuration is activated, and an indication of one or more parameters for the high Doppler configuration, in one or more bits of a physical broadcast channel (PBCH).

28. The BS of claim 27, wherein the one or more parameters comprise:
   a Doppler range for the high Doppler configuration, and
   a PTRS configuration for the high Doppler configuration.

29. The BS of claim 24, wherein the one or more processors are further configured to:
   transmit an indication of the high Doppler configuration in a radio resource control (RRC) communication; and
   wherein the one or more processors, when transmitting the indication that the high Doppler configuration is activated, are configured to:
      transmit the indication that the high Doppler configuration is activated in a downlink control information (DCI) communication.

30. The BS of claim 24, wherein the one or more processors are further configured to:
   transmit an indication of the high Doppler configuration in a downlink control information (DCI) communication,
      wherein the high Doppler configuration overrides another high Doppler configuration that was transmitted in a radio resource control (RRC) communication.

* * * * *